US 11,779,029 B2

(12) United States Patent
Felicetti et al.

(10) Patent No.: US 11,779,029 B2
(45) Date of Patent: Oct. 10, 2023

(54) METHOD AND SYSTEM FOR THE TREATMENT OF AGRICULTURAL PRODUCTS

(71) Applicant: Pace International, LLC, Wapato, WA (US)

(72) Inventors: David Felicetti, Prosser, WA (US); Scott Christie, Yakima, WA (US); Robert Fassel, Naches, WA (US)

(73) Assignee: PACE International LLC, Wapato, WA (US)

( * ) Notice: Subject to any disclaimer, the term of this patent is extended or adjusted under 35 U.S.C. 154(b) by 469 days.

(21) Appl. No.: 15/580,514

(22) PCT Filed: Dec. 5, 2017

(86) PCT No.: PCT/US2017/064587
§ 371 (c)(1),
(2) Date: Dec. 7, 2017

(87) PCT Pub. No.: WO2018/106622
PCT Pub. Date: Jun. 14, 2018

(65) Prior Publication Data
US 2019/0166861 A1     Jun. 6, 2019

Related U.S. Application Data

(60) Provisional application No. 62/497,850, filed on Dec. 5, 2016.

(51) Int. Cl.
*A23B 7/152* (2006.01)
*A23B 7/144* (2006.01)
*F25D 17/04* (2006.01)

(52) U.S. Cl.
CPC .............. *A23B 7/152* (2013.01); *A23B 7/144* (2013.01); *A23V 2002/00* (2013.01); *F25D 17/042* (2013.01)

(58) Field of Classification Search
CPC ................................ A23B 7/152; A23B 7/144
See application file for complete search history.

(56) References Cited

U.S. PATENT DOCUMENTS

| 5,872,721 A   | 2/1999 | Huston |
|---|---|---|
| 6,601,653 B2 * | 8/2003 | Grabow .................. A62C 3/08 |
|  |  | 169/11 |

(Continued)

FOREIGN PATENT DOCUMENTS

| CN | 201837619 U | * | 5/2011 |
|---|---|---|---|
| CN | 205301017 U | * | 6/2016 |
| JP | 2002090269 A | * | 3/2002 |

OTHER PUBLICATIONS

International Search Report and Written Opinion, dated Feb. 27, 2018, in International Application No. PCT/US17/64587.

(Continued)

*Primary Examiner* — Changqing Li
(74) *Attorney, Agent, or Firm* — Wood, Phillips, Katz, Clark & Mortimer

(57) ABSTRACT

Systems and methods are disclosed for the generation of a treatment compound fluid to inhibit the ripening process of agricultural products, the application of the treatment compound fluid to a confined atmosphere at a location at which the products are stored, and the collection of a sample of the treated atmosphere. In one form, the system includes a treatment compound generator and a sampling subsystem. The treatment compound generator has an exit port fluidly connectable to the confined atmosphere and is configured to generate a treatment compound fluid in-situ. The sampling subsystem includes an inlet port fluidly connected to a pump and a collection chamber. The inlet port is fluidly connectable to the confined atmosphere such that the sampling (Continued)

subsystem can collect a sample of the treated atmosphere through the inlet port and store the sample within the collection chamber.

8 Claims, 6 Drawing Sheets

(56) References Cited

U.S. PATENT DOCUMENTS

| | | | |
|---|---|---|---|
| 6,770,600 B1* | 8/2004 | Lamola | A01N 27/00 |
| | | | 504/357 |
| 8,163,244 B2 | 4/2012 | Yoo | |
| 8,314,051 B2 | 11/2012 | Yoo | |
| 2003/0220201 A1 | 11/2003 | Kostansek et al. | |
| 2011/0014334 A1 | 1/2011 | Regiroli | |
| 2014/0017134 A1 | 1/2014 | Yoo et al. | |
| 2018/0356384 A1* | 12/2018 | Faubion | G01N 33/0073 |

OTHER PUBLICATIONS

Watkins, CB, et al., "Responses of early, mid and late season apple cultivars to postharvest application of 1-methylcyclopropene (1-MCP) under air and controlled atmosphere storage conditions", Postharvest Biology and Technology 19 (2000), 17-32 (entire document).

* cited by examiner

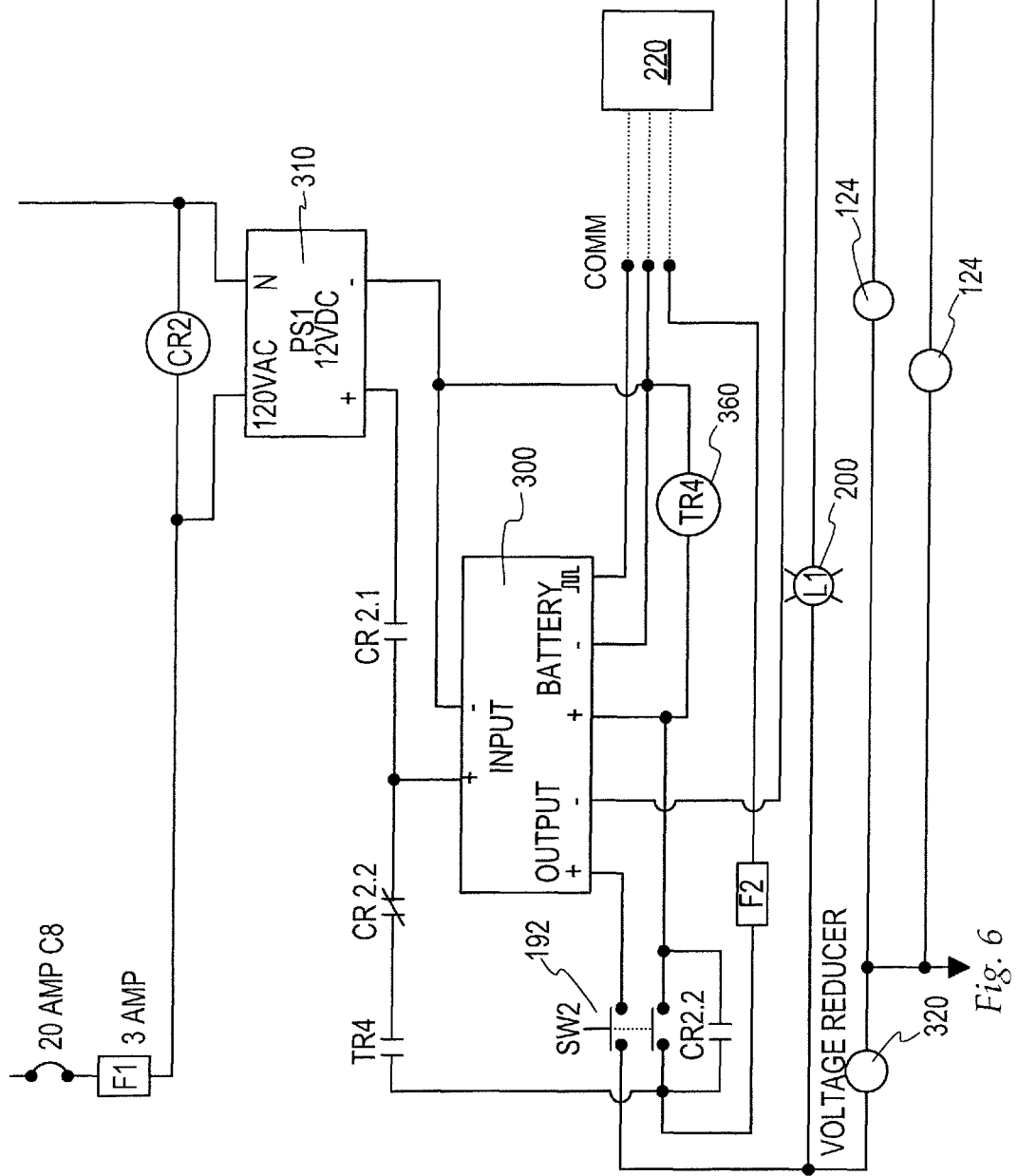

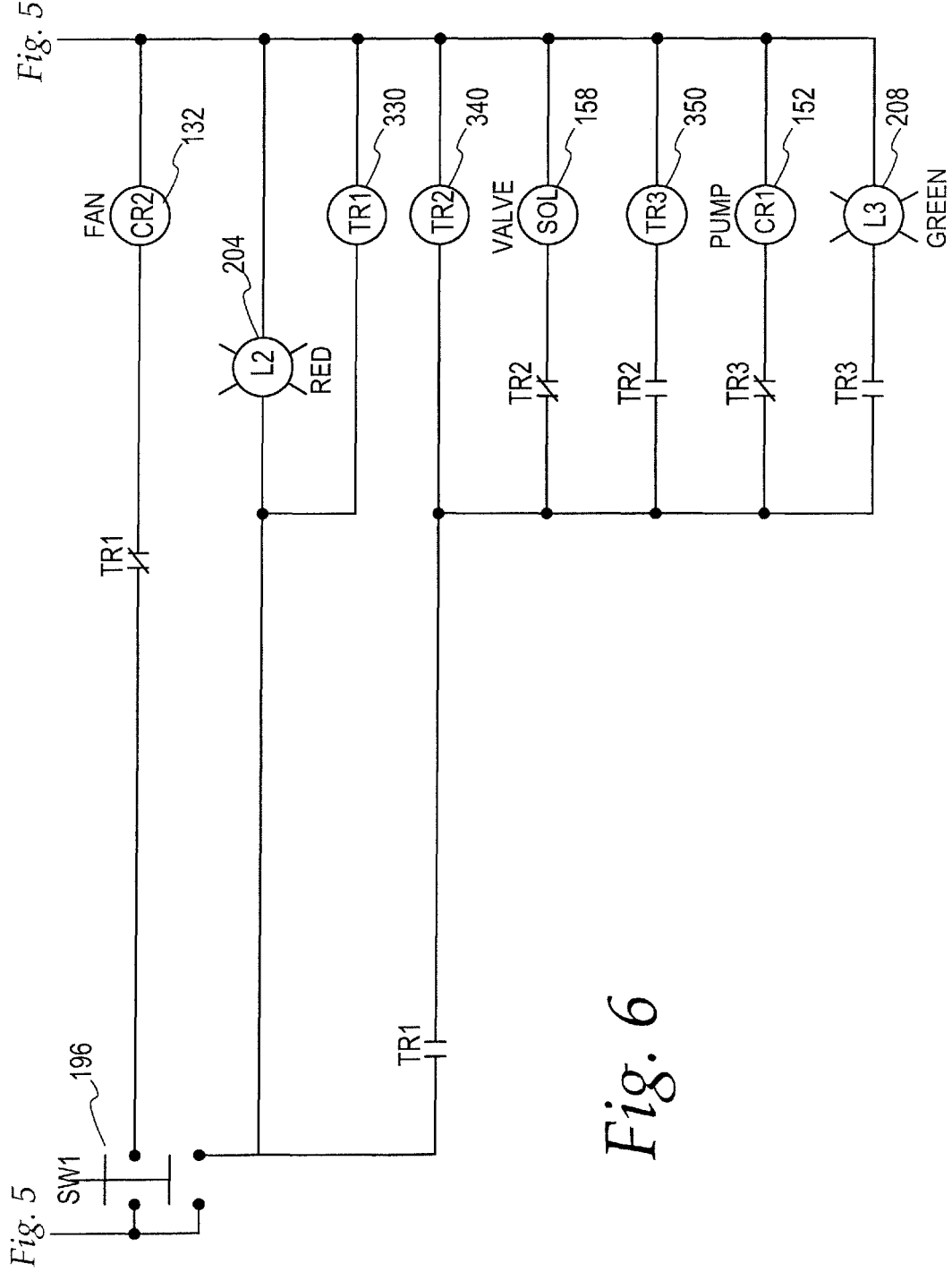

METHOD AND SYSTEM FOR THE TREATMENT OF AGRICULTURAL PRODUCTS

FIELD OF THE INVENTION

The present invention relates to systems and methods for generating and introducing a treatment compound fluid into a confined atmosphere within a space at a treatment location containing agricultural products such as fruits, flowers, vegetables, and the like, and for sampling the treated atmosphere.

BACKGROUND OF THE INVENTION AND TECHNICAL PROBLEMS POSED BY THE PRIOR ART

Forty-percent of agricultural products in North America are lost to waste prior to reaching the consuming public. Many agricultural products, such as apples and other produce, are stored in a confined atmosphere of a space within a storage facility or other location for extended periods of time following a harvest. Many facilities have controlled environments wherein the temperature, oxygen levels, and/or moisture levels may be adjusted to delay the ripening process of the agricultural products.

Treatment compounds have been developed to further inhibit the ripening process of some agricultural products. Cyclopropene compounds, such as 1-methylcyclopropene (hereinafter "1-MCP"), work by blocking or otherwise delaying the ethylene signaling of agricultural products. 1-MCP is typically applied in a gaseous form, but such a gas is known to degrade when stored for significant periods of time.

Methods of treatment have developed to generate or produce 1-MCP in-situ, at a dedicated storage location, by combining precursor chemicals on site. In one known method, a 1-MCP generator is deployed at a storage location and fluidly connected to the interior, confined atmosphere at the location. The 1-MCP is produced as a gas that is pumped into the confined atmosphere to treat the stored agricultural products.

During a typical application of 1-MCP, the 1-MCP generator is located outside of a structure defining the storage space (e.g., refrigerator, warehouse, etc.) and may be exposed to the elements. Therefore, an operator or technician running the generator may need to construct a makeshift structure to protect the generator from the elements. In addition, the operator must be physically present to monitor the generator during the generation and the application of 1-MCP.

To ensure the effective application of 1-MCP to the atmosphere of the storage location, the operator must physically sample the atmosphere in the location after the application of 1-MCP. This sampling is performed manually with a hand-operated bulb.

The inventors have found that there exists a need in the industry for an improved system and method for efficiently and effectively generating and applying treatment fluid (e.g., gas), such as 1-MCP, to the atmosphere in a storage environment. Furthermore, the inventors have found that there exists a need in the industry for efficiently, consistently, and accurately sampling the storage environment atmosphere after the application of the treatment compound.

SUMMARY OF THE INVENTION

In one form, the invention is directed toward a method of treating an agricultural product in a confined atmosphere within a space at a treatment location to inhibit a ripening process of the agricultural product. The method includes the step of deploying a portable treatment system at the treatment location. The treatment system has at least one treatment compound generator configured to deliver a treatment compound fluid. The treatment system further has a sampling subsystem configured to obtain a sample of the confined atmosphere for analysis. The method includes the step causing the at least one compound generator and sampling subsystem to be operated so that: the at least one treatment compound generator delivers the treatment compound fluid to the confined atmosphere; and the sampling subsystem automatically obtains a sample of the confined atmosphere treated by the treatment compound fluid at a preselected time.

In one aspect of the method, the generated treatment compound fluid is a cyclopropene selected from the group consisting of cyclopropene, 1-methylcyclopropene, 1-ethylcyclopropene, 1-propylcyclopropene, 1-butylcyclopropene, 1-pentylcyclopropene, 1-hexylcyclopropene, 1-heptylcyclopropene, 1-octylcyclopropene and any combination thereof.

In one aspect of the method, the method includes the step of analyzing the sample to determine the concentration of the treatment compound fluid within the sample.

In another aspect of the method, the step of analyzing the sample is automatically performed by the portable treatment system at the treatment location.

In yet another aspect of the method, the method further includes the step of repeating the step of causing the at least one compound generator and sampling subsystem to be operated if the concentration of the treatment compound fluid within the sample falls below a pre-determined threshold concentration.

In one aspect of the method, the method further includes the step of evacuating a fluid through the sampling subsystem for a selected amount of time prior to the step of obtaining a sample.

In one aspect of the method, the treatment compound fluid is 1-methylcyclopropene.

In one aspect of the method, the method further includes the step of supplying power to the treatment compound generator from one of an external power source and an internal power source carried within the treatment system.

In one aspect of the method, the method further includes the step of providing at least one visual or audio indication that a sample has been collected with the treatment system subsequent to obtaining the sample.

In another aspect of the method, the method further includes the step of maintaining the temperature within the treatment system below a preselected value.

In another aspect of the method, the method further includes the steps of fluidly connecting the at least one treatment compound generator with the confined atmosphere with a first flexible line and fluidly connecting the sampling subsystem with the confined atmosphere with a second flexible line.

In another aspect of the method, the portable treatment system is a self-contained, operable unit and the step of deploying the treatment system includes temporarily transporting the treatment system to the treatment location.

In another form, the invention is directed toward a system for treating an agricultural product in a confined atmosphere within a space at a treatment location to inhibit a ripening process of the agricultural product. The system includes a portable case containing at least one treatment compound generator and a sampling subsystem. The at least one treatment compound generator has an exit port and is configured to generate a treatment compound at the treatment location. The exit port fluidly connectable to the confined atmosphere of the space at the treatment location to release a treatment compound fluid into the confined atmosphere. The sampling subsystem includes an inlet port fluidly connected to a pump and a collection chamber. The inlet port is fluidly connectable to the confined atmosphere of the space at the treatment location to (i) collect a sample of the confined atmosphere through the inlet port with the pump, and (ii) store the sample within the collection chamber.

In one aspect of the system, the treatment compound fluid is a 1-methylcyclopropene gas.

In one aspect of the system, the cyclopropene compound fluid is selected from the group consisting of cyclopropene, 1-methylcyclopropene, 1-ethylcyclopropene, 1-propylcyclopropene, 1-butylcyclopropene, 1-pentylcyclopropene, 1-hexylcyclopropene, 1-heptylcyclopropene, 1-octylcyclopropene and any combination thereof.

In another aspect of the system, the portable treatment system is a self-contained operable unit configured to be temporarily transported to, operated at, and transported away from the treatment location by a user of the system.

In another aspect of the system, the case further includes a power supply subsystem, the power supply subsystem connected with, and supplying power to, the at least one of the treatment compound generator and the sampling subsystem.

In one aspect of the system, the case further includes a control unit operably connected with the at least one of the treatment compound generator and the sampling subsystem. The control unit includes at least one timing circuit configured to operate the sampling subsystem at a preselected time.

In another aspect of the system, the case further includes a control unit operably connected with the at least one of the treatment compound generator and the sampling subsystem. The control unit includes at least one indicator light indicating the status of the sampling subsystem.

In one aspect of the system, the case further includes a fan mounted to the case and configured to draw air out of the case.

In one aspect of the system, the at least one treatment compound generator has the form of a pair of 1-methylcyclopropene generators configured to generate 1-methylcyclopropene gas.

In one aspect of the system, the sampling subsystem includes a three-way valve fluidly connected between the pump and the collection chamber and fluidly connected to an exhaust line.

In another form, the invention is directed toward a system for treating an agricultural product in a confined atmosphere within a space at a treatment location to inhibit a ripening process of the agricultural product. The system includes a portable case containing at least one treatment compound generator and a power supply subsystem. The at least one treatment compound generator having an exit port and being configured to generate a treatment compound fluid at the treatment location, the exit port fluidly connectable to the confined atmosphere of the space at the treatment location to release a treatment compound fluid into the confined atmosphere. The treatment compound fluid is a 1-methylcyclopropene gas. The power supply subsystem is connected with, and supplies power to, the at least one treatment compound generator.

BRIEF DESCRIPTION OF THE DRAWINGS

In the accompanying drawings forming part of the specification, in which like numerals are employed to designate like parts throughout the same:

FIG. 1 shows the system deployed for the treatment of a confined atmosphere of a space within a storage location;

FIG. 5 is a partial view of one preferred wiring schematic of the system of FIG. 1; and FIG. 6 is another partial view of the wiring schematic of FIG. 5.

DETAILED DESCRIPTION OF THE DRAWINGS

While the following describes a preferred embodiment of the present invention, it is to be understood that this description is made by way of example only and is not intended to limit the scope of the present invention. It is expected that alterations and further modifications, as well as other and further applications of the principles of the present invention, will occur to others skilled in the art to which the invention relates and, while differing from the foregoing, remain within the spirit and scope of the invention as herein described and claimed.

Figure 1:
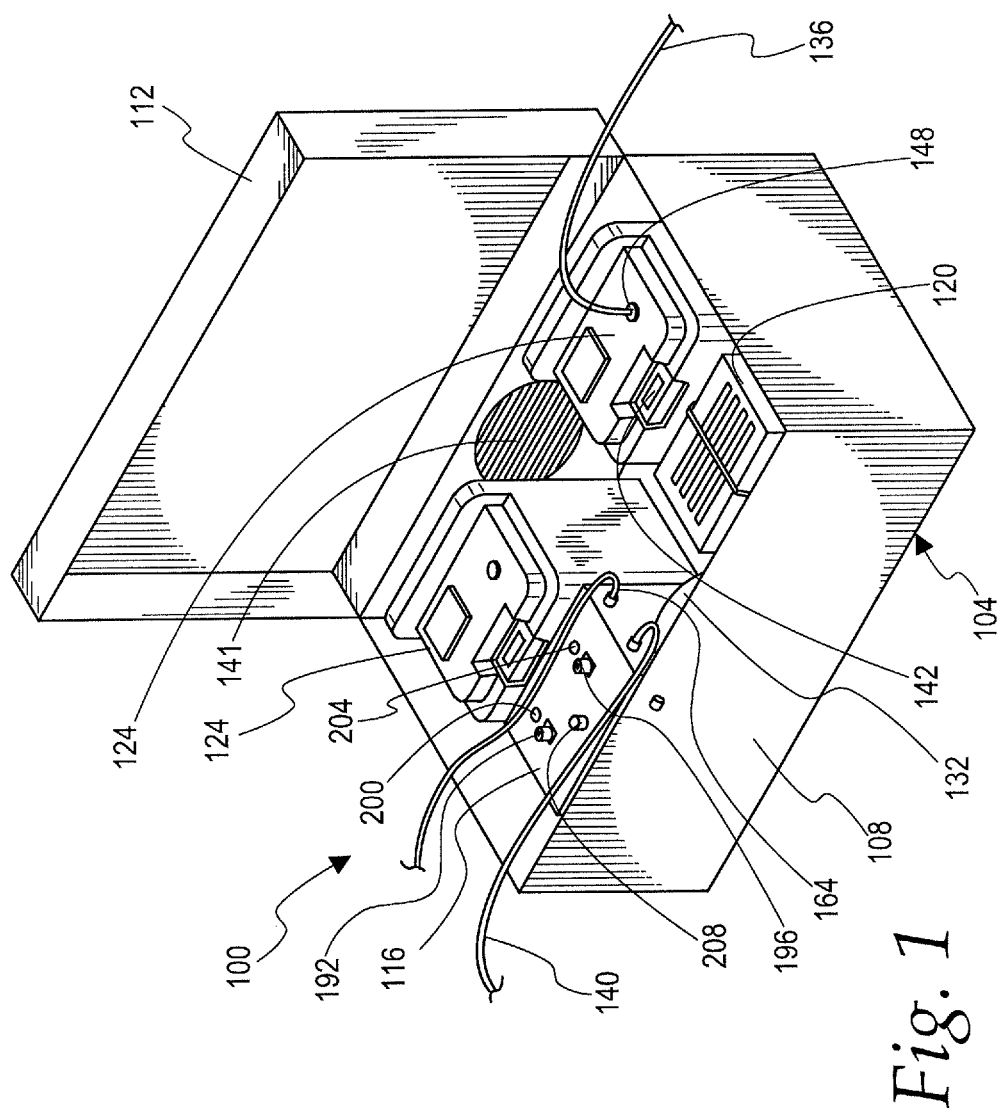
FIG. 1 is a perspective view, taken from above, of a treatment system according to the present invention.
Figure 2:
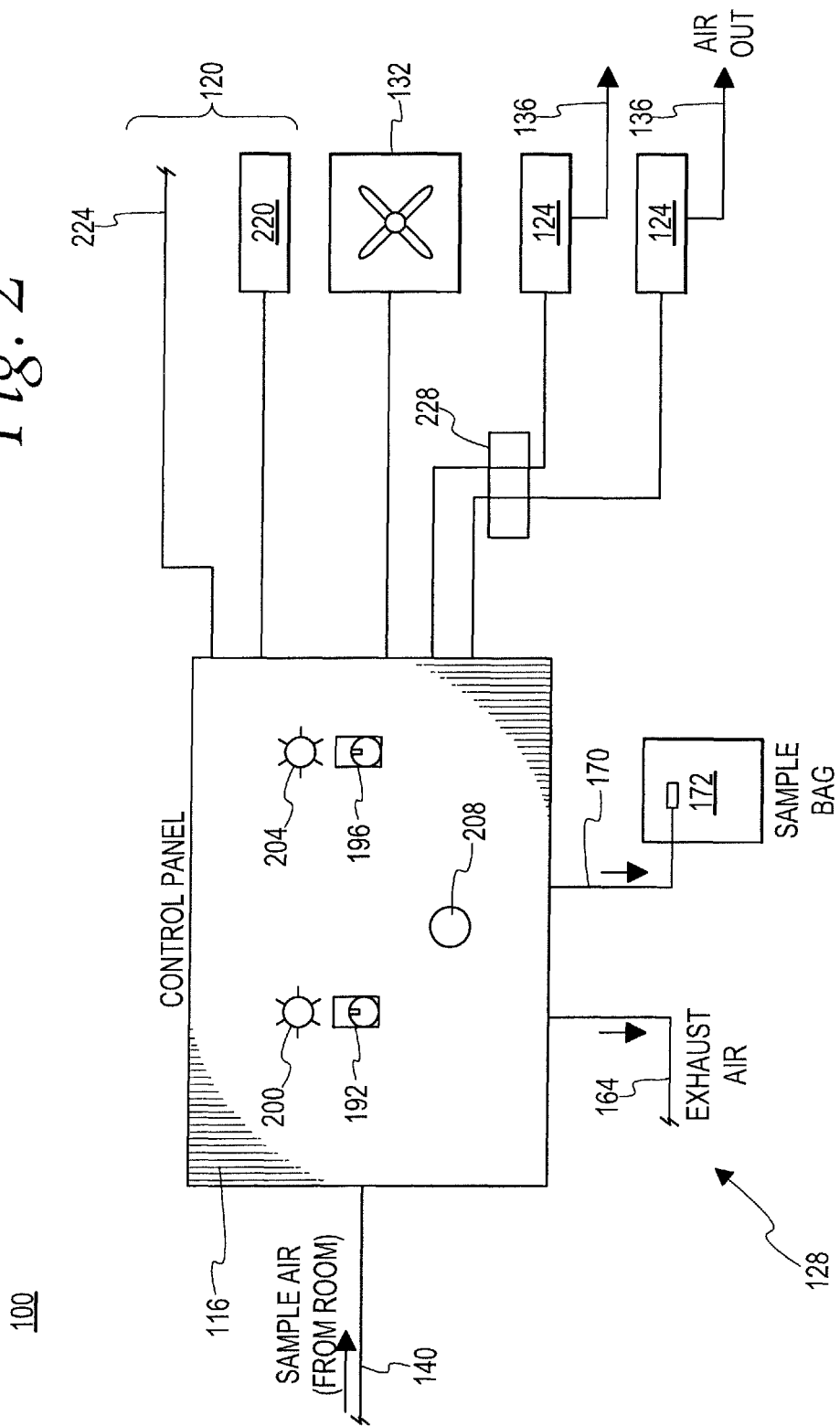
FIG. 2 is a diagrammatic, simplified view of a component layout of the system shown in FIG. 1.
Figure 3:
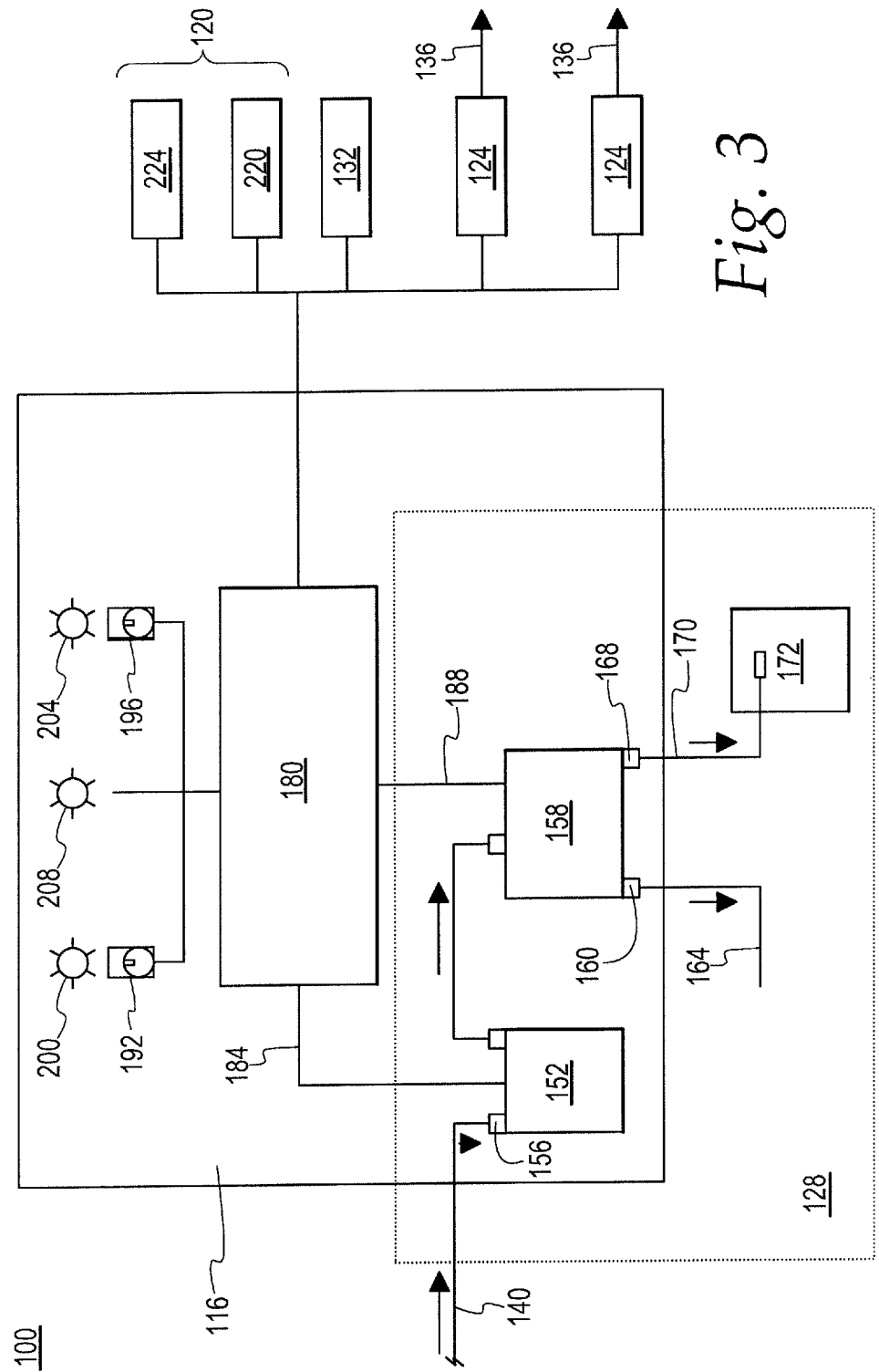
FIG. 3 is a diagrammatic, simplified view of a control scheme of the system shown in FIG. 1.

FIGS. 1-3 show a treatment system 100 according to the present invention, and components thereof, for the in-situ generation and release of a treatment compound in liquid/gaseous form into the local air or other confined atmosphere of a dedicated storage facility or other location where agricultural products (e.g., plants or plant byproducts) are staged or stored. The system 100 may also advantageously be used for obtaining an atmospheric sample from the storage location before, during, and/or after the release of the treatment compound.

Referring now to FIG. 1, the system 100 includes a transportable case 104 having a base 108 and a cover or lid 112 that is hingedly movable with respect to the base 108. Other constructions or arrangements, although not illustrated, may be used for the case 104. For example, the lid 112 may be fully removable from the base 108, or may be slidably attached with the base 108. The case 104 need not have any discernible lid 112 for some applications. The case 104 is preferably made from a durable plastic or metal that is weatherproof and resistant to the sun, rain, wind, and extreme temperatures that might otherwise harm the system components within the case 104. Other suitable materials may be used.

In the illustrated embodiment of the system 100, as best shown in FIGS. 1-3, the case 104 (FIG. 1 only) contains: a control unit or panel 116; a power supply subsystem 120; two treatment compound generators 124; a sampling subsystem 128 (FIGS. 2 and 3 only); a fan 132; outlet tubing 136 for fluidly connecting one of the treatment compound generators 124 to the atmosphere of a storage location; and inlet tubing 140 for fluidly connecting the sampling subsystem 128 to the atmosphere of the storage location.

The arrangement and operation of these components will be discussed in detail below. It will be noted that the number and arrangement of these components may be modified depending on a given application, and some of the components may be combined with one another, or may even be omitted altogether. The case 104 may further be provided with foam cushioning, straps, tie-downs, dividers, and other means for organizing and securing the components of the system 100 within the case 104 for improved ruggedness and transportability, and for efficient deployment. The case 104 may be provided with handles, grips, straps for being easily transported to the storage location by a minimal number of technicians or operators, and more preferably the case 104 may be transported and deployed on site by a single operator.

With reference to FIG. 1, the fan 132 is mounted within the base 108 to draw air through the case 104. The air is evacuated from the case interior through two vents 141 in the base 108 to cool the components of the system 100 within the case 104. The interior of the case 104 could potentially overheat when the case 104 is exposed to direct sunlight, and could further overheat due to the operation of the system components.

Tubing used in the system, including the inlet tubing 140 and the outlet tubing 136, are commercially available ¼-inch polyethylene type tubing. Different sizes and materials of tubing may be used. The tubing is preferably made from an inert material or materials that are not reactive with the treatment compound being generated.

The two treatment compound generators 124 that are illustrated in FIGS. 1 and 2 are 1-MCP generators for producing 1-MCP in a gaseous form in-situ. Such generators are marketed under the brand name of Fysium® by Janssen Pharmaceutica NV, having offices at Turnhoutseweg 30, 2340 Beerse, Belgium. The principles of operation and general construction of such 1-MCP generators are described in United States Patent Application Publication No. 2014/0017134 A1, and U.S. Pat. Nos. 8,163,244 B2 and 8,314,051 B2, which are all incorporated herein by reference in their entirety. Each of the generators 124 contains an air pump, a heater, a control unit 144, and a removable cartridge with three chambers containing the precursor compounds of the 1-MCP treatment gas. The cartridge of each generator 124 has an outlet or exit port 148, as seen in FIG. 1, for receiving one end of the outlet tubing 136 to fluidly connect the generator 124 to the atmosphere of a treatment location. The operation of the generators 124 will be discussed below in the detailed discussion of the operation of the system 100 as a whole.

Different treatment compounds may be generated in-situ and applied by the system disclosed herein. Furthermore, other types of in-situ compound generators may be used in place of the generators 124. The system disclosed herein, while particularly advantageous for use with 1-MCP for the treatment of agricultural products, need not be limited to use with only 1-MCP and generators of 1-MCP. Other treatment compounds may be used with the inventive system to inhibit the ripening of plants or plant byproducts. In addition, it will be understood that a different number of generators 124 may be used in the system 100, depending on the particular application.

With reference to FIG. 3, the sampling subsystem 128 includes a pump 152 with an inlet port 156. The inlet port 156 is for being fluidly connected with the inlet tubing 140 for pumping in or otherwise obtaining an atmospheric sample of the treatment location atmosphere. The pump 152 is fluidly connected with a three-way valve 158 having an exhaust port 160 leading to an exhaust line 164 for clearing or evacuating the sampling system 128 prior to obtaining a sample. The three-way valve 158 is further provided with a sample port 168 that is fluidly connected to a sample line 170 terminating at an air-tight sample bag, jar, or suitable container 172.

While FIG. 3 shows various components of the sampling subsystem 128 contained within the control panel 116, it will be appreciated that these components may be provided as a separate device or devices outside of, or distinguishable from, or completely integrated within, the control panel 116.

It will be understood that a more complex valve and tubing arrangement could be used if there are multiple sample bags 172 connected with the sampling subsystem 128. For example, a four-way or five-way valve (not illustrated) may be used in place of the three-way valve 158 to direct samples to one or more sample bags 172. Furthermore, multiple electrically-controlled valves may be connected with air-tight tubing in parallel or series configurations to effectuate a more complex control scheme to collect multiple samples and to selectively evacuate the entrapped air or gas from various portions of the sampling subsystem between collection of samples.

Still referring to FIG. 3, the control panel 116 includes a control circuit 180 that is electrically connected with, and configured to control the operation of, the pump 152 via a pump control circuit 184. The control panel 116 further includes a valve control circuit 188 for selectively opening and closing the exhaust port 160 and the sample port 168 of the three-way valve 158.

It will be appreciated by those skilled in the art that there are many possible modifications that may be made to the control circuit 180, while keeping within the spirit of the concepts disclosed herein. Accordingly, no limitations should be read into the claims, based on the specific arrangement of the control circuit 180 disclosed herein, unless expressly recited in the claims. One exemplary wiring layout for the system 100 is illustrated in detail in FIGS. 5 and 6, which will be discussed in greater detail below.

As further can be seen in FIG. 3, the control panel 116 includes a knob or power switch 192 electrically connected with the control circuit 180 for energizing the control circuit 180, and having an "on" position and an "off" position. The control panel 116 further includes a knob or mode switch 196 electrically connected with the control circuit 180 for alternating between the different modes of operation of the sampling subsystem 128, between (1) a "hand" sampling mode, (2) an "auto" sampling mode, and (3) an "off" mode wherein the sampling subsystem 128 is not used.

As shown in FIG. 3, the control circuit 180 is electrically connected with each of a power indication light 200, a running indication light 204, and a completion indication light 208. When a user moves the power switch 192 from the "off" position to the "on" position, the power indication light 200 is energized by the control circuit 180 to indicate to the user that system 100 is operational. The running indication light 204 is energized by the control circuit 180 to indicate to the user that the sampling system 128 will operate in an automated sampling mode, only when the mode switch 196 is set by the user to the "auto" sampling mode. The running indication light 204 will not be energized when the mode switch 196 is set to a "hand" mode. The completion indication light 208 will be energized by the control circuit 180 to indicate to the user of the system 100 that: 1) the atmosphere of the storage location has been treated with a treatment compound; and 2) the pump 152 has operated to collect an atmospheric sample within the location, and the sample has been stored in the sample container 172.

The control circuit 180 includes several timers or timing circuits for use in the "auto" mode of the system 100. A first timer or timing circuit energizes the pump 152 and further energizes and actuates the three-way valve 158 to evacuate entrapped fluid (e.g., air) from the sampling subsystem 128 prior to obtaining a sample of the storage environment atmosphere after treatment thereof. When the system 100 is used for applying 1-MCP, the first timing circuit is set to energize the pump 152 and valve 158 approximately two hours after the system 100 is placed into the "auto" mode by the user.

The first timer actuates the three-way valve 158 to close off the sample port 168 and to open the exhaust port 160 and further runs the pump 152 for approximately ten seconds to evacuate fluid/air within the sampling subsystem 128 through the exhaust port 160 and out through the exhaust line 164 prior to obtaining a sample. Clearing the air or gas trapped within the sampling subsystem 128 ensures that the sample collected by the system 128 is free of contamination (e.g., from air collected in previous sampling at other facilities).

After the first timing circuit has completed the line evacuation operation discussed above, a second timer or timing circuit removes power from the three-way valve 158 to close off the exhaust port 160 and to open the sample port 168. With the sample port 168 open, a third timing circuit then runs the pump 152 for approximately ten seconds to draw a sample of the treated atmosphere of the storage location into the sample container 172.

After the third timing circuit has completed the sample collection operation discussed above, the control circuit 180 de-energizes the pump 152 and energizes the completion indication light 208 on the control panel 116, informing the user of the system 100 that the sample has been collected.

It will be understood by those skilled in the art that different timing operations may be utilized depending on the particular treatment compound being utilized, the size of the storage environment being treated, and the number and timing of the samples to be taken. The inventors have found that the timing operations discussed herein are particularly advantageous for treating agricultural products, such as apples, with a 1-MCP gas.

It will be further understood that a greater or lesser number of timing circuits may be utilized in the control circuit 180. Furthermore, one or more of the above-discussed timing operations may be performed by hardware, software, and/or a combination thereof. Accordingly, no limitations to the specific timing algorithm disclosed herein should be read into the claims unless expressly recited in the claims. Although an exemplary timing algorithm has been described in detail above, other algorithms are possible with the inventive system disclosed herein.

With reference now to FIGS. 2 and 3, the power supply subsystem 120 includes a rechargeable battery 220 with a sufficient capacity to provide power to all electrical components of the system 100 for at least one application of a treatment compound and subsequent collection of a sample of the treated atmosphere of a storage location. For example, the battery 220 holds a sufficient charge to operate one of the generators 124 to generate and release 1-MCP in-situ, operate the control panel 116 and control circuit 180 to actuate the pump 152 and three-way valve 158, and operate the fan 132 to cool the interior of the case 104. Preferably, the battery 220 provides 24 VDC to the system 100.

Still referring to FIGS. 2 and 3, the system 100 includes a charging subsystem or circuit 224 that may be suitably configured to receive standard AC power (e.g., 110/220 VAC). When the charging subsystem 224 is connected to AC power, it powers the electrical components of the system 100 and recharges the battery 220.

One typical method of operation of the system 100 will now be discussed. A user or technician would transport and deploy the case 104 at the location where the fruits or vegetables to be treated are confined. The system is intended to be deployed on quickly and efficiently on-demand to treat agricultural products that are stored in a variety of different types of facilities. If available, the user would connect the charging subsystem 224 to AC power. Some of these facilities may be remote and may not be configures with an available outlet with AC power, in which case the battery 220 would provide power to the treatment compound generator 124.

The user would turn the power switch 192 on the control panel 116 to the "on" position, which provides constant 24 VDC from either the battery 220 or the charging subsystem 224 to the generators 124 and the cooling fan 132. The user would verify that the generator 124 is receiving power and would proceed to arm the generator 124 by placing a cartridge with three chambers containing the precursors of the 1-MCP treatment gas. The display 142 of the generator 124 would indicate via a text display that it is ready to start the process of generating the 1-MCP treatment gas. The user would connect one end of the outlet tubing 136 to the exit port 148 of one of the generators 124 and connect the other end of the outlet tubing 136 into the confined atmosphere of the storage location. In a typical application, any external ducting or air channels within the storage location are closed during the application of the 1-MCP treatment gas.

If the system 100 is to be used to collect a sample of the treated atmosphere, then the user would place one end of the inlet tubing 140 within the storage location and connect the other end of the inlet tubing 140 to the sampling subsystem 128.

The user would then press the start button on the generator 124 control panel 142 to begin the process of generating the 1-MCP treatment gas on site. The generation of the treatment gas generally involves a preheating phase, followed by the pumping of the treatment gas through the outlet tubing 136 into the confined atmosphere within the storage location for about two hours. If the sample is to be collected automatically, then the user would further set the mode switch 196 to the "auto" position after the preheating phase.

With the system set to the "auto" mode, the user need not provide any further input into the system 100. The first timing circuit would energize the pump 152 and three-way valve 158 approximately two hours after the system 100 is placed into the "auto" mode by the user. The first timing circuit would actuate the three-way valve 158 to close off the sample port 168 and to open the exhaust port 160, running the pump 152 for approximately ten seconds to evacuate any trapped air or gases within the sampling subsystem 128 through the exhaust port 160 and out through the exhaust line 164 prior to obtaining a sample. The second timing circuit would remove power from the three-way valve 158 to close off the exhaust port 160, open the sample port 168. The third timing circuit would then run the pump 152 for approximately ten seconds to draw a sample of the treated atmosphere of the storage environment into the sample container 172. The control circuit 180 then de-energizes the pump 152 and energizes the completion indication light 208 on the control panel 116 to notify the user that the sample has been collected.

The sample of the treated atmosphere may subsequently be analyzed, either on-site or at a location with appropriate analysis equipment, to determine if the concentration of the treatment compound within the sample has reached a predetermined level. It may be particularly beneficial to conduct such analysis on site, with the system 100 so that the user or technician would not need to make repeated trips to the treatment location for subsequent applications of a treatment gas.

In one alternative mode of operation of the system 100, the system 100 would not be used to obtain a sample of the treated storage environment atmosphere. In this mode of operation, the user would set the mode switch 196 to the "off" position. As described above, the user would wait about two hours until the display on the generator 124 indicated that the treatment was finished. The user would then proceed to collect a sample of the treated storage environment atmosphere with a bulb or other similar manual device that is not included in the system 100.

The inventors have found that the system 100 may be advantageously deployed automatically by a minimum number of trained personnel and that such personnel need not monitor the system 100 during its operation, unlike the prior art method discussed above.

Furthermore, the inventors have found that the automatic collection of the atmospheric sample with the sampling subsystem 128 may improve the accuracy and repeatability of the sampling, compared to the prior art method discussed above, because the collection of the sample is not dependent on the user of the system 100. For example, if the user were to collect the sample of the treated atmosphere within the location either a) prior to the completion of the treatment gas generation, or b) too long after the application of the treatment gas, then the subsequent analysis of the sample may not be an accurate or reliable measurement of the actual concentration of the treatment gas within the storage location. Such inaccuracies or lack of reliability may necessitate that the user must again release a treatment compound into the storage location atmosphere, which increases costs for both the additional treatment compound used and the additional operator time. The system 100 may be particularly advantageous because the operator need not closely attend to the system 100 during operation, and may instead deploy other systems 100 at other treatment locations in the meantime.

Figure 4:
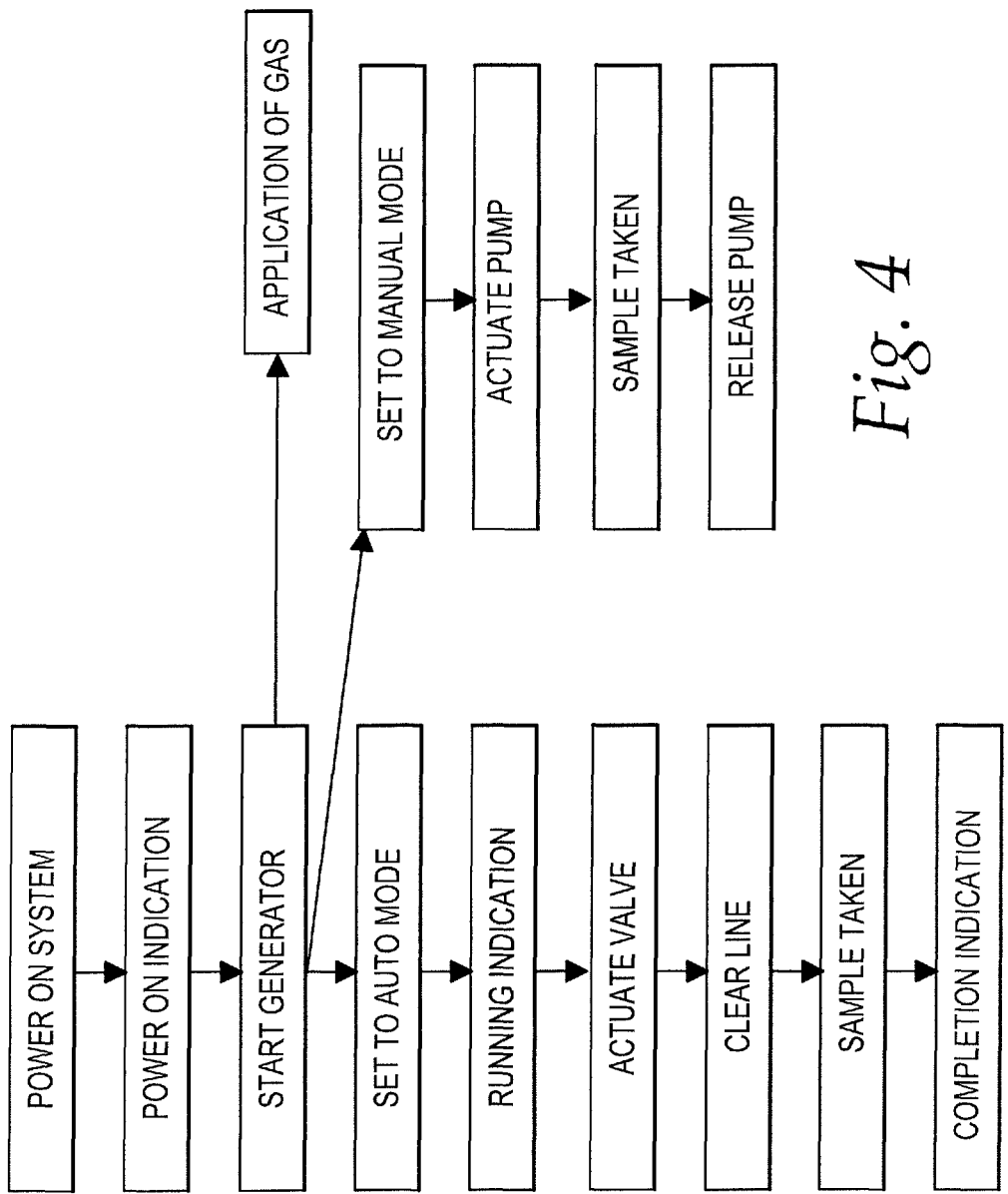
FIG. 4 is a flow diagram of a method of operating the system shown in FIG. 1.

In another alternative mode of operation of the system 100, the system 100 could be used to manually sample the treated storage atmosphere. The user would prepare and actuate the generator 124 as described above, and the user would wait about two hours until the display on the generator 124 indicated that the treatment was finished. The user would then proceed to set the mode switch 196 to the "hand" position. This would directly energize the pump 152 to draw a sample of the treated storage environment atmosphere into the sampling subsystem 128 for storage in the sample container 172. The user would then return the mode switch 196 to the "off" position to de-energize the pump 152. FIG. 4 illustrates a flow diagram of two modes of operation of the system 100 as described above.

One particularly advantageous wiring schematic or detailed layout of the controls of the system 100 is illustrated in FIGS. 5 and 6. In this layout, the system 100 includes an uninterruptible power supply 300 (FIG. 5 only) coupled with a 110/220 VAC to 24 VDC power supply 310 (FIG. 5 only), which power the system 100 and charge the battery 220 (FIG. 5 only) when the system 100 is connected to AC power. A 24 VDC regulator 320 (FIG. 5 only) provides power to the generators 124. The above-referenced first timer is designated by the numeral 330 (FIG. 6 only), the above-referenced second timer is designated by the numeral 340 (FIG. 6 only), and the above-referenced third timer is designated by the numeral 350 (FIG. 6 only).

The detailed layout illustrated in FIGS. 5 and 6 is particularly advantageous because the uninterrupted power supply 300 is configured to monitor the voltage of the battery 220. A fourth timer 360 (FIG. 5 only) is provided to temporarily connect the battery 220 to the input terminals of the uninterrupted power supply 300. The uninterrupted power supply 300 then powers the circuit, providing constant power with or without connection of the system 100 with external AC power. If the battery 220 voltage falls below the required 24 VDC to power the system 100, then the system 100 is shut down to protect the battery 220.

Although the invention has been described with reference to preferred embodiments, it will be appreciated by persons skilled in the art that the invention can be embodied in many other forms.

The invention claimed is:

1. A method of treating an agricultural product in a confined atmosphere within a space at a treatment location to inhibit a ripening process of the agricultural product, the method comprising the steps of:
   deploying a portable treatment system at the treatment location, the treatment system comprising at least one treatment compound generator configured to deliver a cyclopropene, and a sampling subsystem configured to obtain a sample of the confined atmosphere for analysis;
   operating the at least one treatment compound generator and sampling subsystem comprising the steps of:
   a) the at least one treatment compound generator delivering the cyclopropene to the confined atmosphere;
   b) the sampling subsystem automatically obtaining a sample of the confined atmosphere treated by the cyclopropene at a preselected time;
   c) the sampling subsystem automatically evacuating a fluid through an exhaust port of a three-way valve of the sampling subsystem for a preselected time prior to obtaining the sample; and
   d) the sampling subsystem analyzing the sample to determine the concentration of the cyclopropene within the sample, and
   repeating the step of operating the at least one treatment compound generator and sampling subsystem if the concentration of the cyclopropene within the sample falls below a pre-determined threshold concentration;
   wherein the sampling subsystem includes an inlet port fluidly connected to a pump during sampling and the three-way valve is fluidly connected between the pump and a collection chamber during the steps a)-d), wherein the pump is fluidly connected between the three-way valve and the inlet port such that the pump creates a positive pressure to evacuate the fluid through the exhaust port of the three-way valve of the sampling subsystem for a preselected time prior to obtaining the sample, the inlet port fluidly connected to the confined atmosphere of the space at the treatment location to (i) collect a sample of the confined atmosphere through the inlet port with the pump, and (ii) store the sample within the collection chamber.

2. The method as recited in claim 1 wherein the cyclopropene is selected from the group consisting of cyclopropene, 1-methylcyclopropene, 1-ethylcyclopropene, 1-propylcyclopropene, 1-butylcyclopropene, 1-pentylcyclopropene, 1-hexylcyclopropene, 1-heptylcyclopropene, 1-octylcyclopropene and any combination thereof.

3. The method as recited in claim 1 wherein the cyclopropene is 1-methylcyclopropene.

4. The method as recited in claim 1 further comprising the step of supplying power to the at least one treatment compound generator from one of an external power source and an internal power source carried within the treatment system.

5. The method as recited in claim 1 further comprising the step of providing at least one visual or audio indication that a sample has been collected with the treatment system subsequent to obtaining the sample.

6. The method as recited in claim 1 further comprising the step of maintaining the temperature within the treatment system below a preselected value.

7. The method as recited in claim 1 further comprising the steps of fluidly connecting the at least one treatment compound generator with the confined atmosphere with a first flexible line and fluidly connecting the sampling subsystem with the confined atmosphere with a second flexible line.

8. The method as recited in claim 1 wherein the portable treatment system is a self-contained, operable unit and the step of deploying the treatment system comprises temporarily transporting the treatment system to the treatment location.

\* \* \* \* \*